Feb. 23, 1960

G. B. RAE-FRASER 2,926,316

DUAL FREQUENCY DISCRIMINATOR

Filed July 16, 1956

INVENTOR.
GEORGE B. RAE-FRASER
BY
[signature]
ATTORNEY.

United States Patent Office 2,926,316

Patented Feb. 23, 1960

2,926,316

DUAL FREQUENCY DISCRIMINATOR

George B. Rae-Fraser, Hollywood, Calif., assignor to Triad Transformer Corporation, Venice, Calif., a corporation of California Application July 16, 1956, Serial No. 597,931

3 Claims. (Cl. 333—77)

Figure 1:
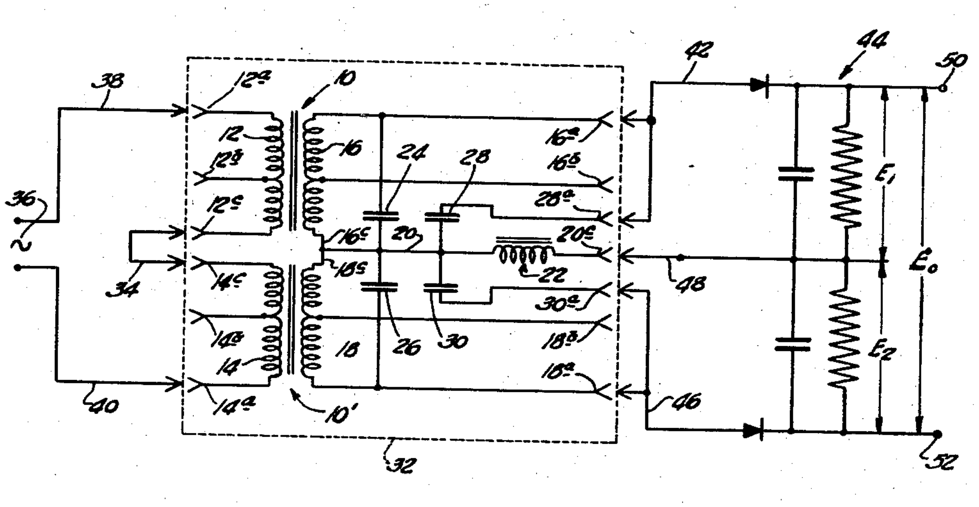

This invention relates to frequency discriminators for demodulating frequency modulated signals, and more particularly to a multi frequency discriminator designed for selective operation at different frequencies.

In most frequency discriminator applications, as for example, conventional frequency modulation receiving systems, the frequency discriminator is designed for operation at a preset frequency, generally referred to as the intermediate frequency. In such applications it is essential that the discriminator operates at said intermediate frequency at all times, and accordingly, no provision is made for selectively changing the operating frequency of the discriminator.

In certain applications, on the other hand, the average frequency of the frequency modulated signal input frequency may have one value under certain operating conditions and another value under other operating conditions. It is essential in such cases that provision be made for discretely adjusting the operating frequency of the discriminator in accordance with the input frequency.

The illustrative embodiment of the invention comprises a dual frequency discriminator which may be discretely varied to operate at a selected one of two discrete operating frequencies.

The invention has as one of its objects the provision of a frequency discriminator of the class described which is discretely variable for operation at a selected one of different operating frequencies.

Of primary importance in multi frequency discriminators for use in certain applications especially those of a military nature, are space and weight factors which often must be maintained at an absolute minimum. One obvious solution to the problem of selective frequency operation of the discriminator with minimum space consumption and weight is by way of interchangeable discriminators designed for different frequency operation and which may be selectively installed in a particular system. Such a solution is impractical, however, owing to the excessive cost and storage space requirements of the duplicate discriminators as well as the difficulty and time involved in the installation of the desired discriminator.

Another solution to the problem, above stated, is the use of removable components, such as coils, capacitors, etc., in the discriminator which may be interchanged to provide for operation on a desired frequency.

This latter solution, again, is impractical because of the excessive time required to effect the insertion of the proper components into the discriminator as well as the necessity of maintaining and transporting a supply of the components with each discriminator. A more serious disadvantage of such an arrangement, however, is the requirement of the additional technical training of the handling personnel which would be necessitated to assure proper installation of the components. Also, in many installations the discriminator components are hermetically sealed in a case so that replacement of the components is precluded.

Accordingly, another object of this invention is the provision of a frequency discriminator, of the class described, comprising fixed electrical components, which, if desired, may be hermetically sealed in a case and whose electrical connection into the discriminator circuit to effect operation on a selected one of different frequencies may be accomplished by simple and rapid manipulations externally of the discriminator case. In this respect, a highly advantageous feature of the invention is the provision of a basic discriminator circuit which is operative on a given frequency. Conversion of this basic circuit to operation on a different frequency is accomplished by the electrical connection or disconnection of certain elements into or from the basic circuit, the majority of the basic circuit elements, however, being utilized during operation at the different frequencies so that the weight and space consumption of the discriminator are maintained at an absolute minimum.

In certain installations wherein the present discriminator finds useful application the maintenance of the same output voltage and approximately at the same phase angle between the discriminator input and output, for a given amplitude and frequency deviation of the input signal at the different operating frequencies is essential.

A further object of the present invention is, therefore, the provision of a frequency discriminator of the class described wherein the magnitude of the discriminator output and the phase angle between the discriminator input and output are maintained substantially constant for a given amplitude and frequency deviation of the input signal at the different operating frequencies.

Yet a further object of the invention is the provision of a frequency discriminator of the class described which is relatively inexpensive to manufacture, designed for simple and rapid conversion from one operating frequency to another, and which has minimum weight and space consumption.

The above and other objects are attained in the illustrative embodiment of the invention, disclosing a dual frequency discriminator, by the provision of basic discriminator circuitry which embodies a pair of inductively coupled circuits connected in series. Each such complete circuit is simply a transformer with an untuned primary and tuned secondary, the secondary of one of the circuits being tuned to a frequency slightly above a given one of the frequencies at which the discriminator is to operate while the secondary of the other is tuned to a frequency slightly below such frequency. The outputs of these two circuits are fed to suitable external electrical differential circuitry in order to yield an output voltage which varies linearly with the frequency deviation in the frequency modulated input signal from the average frequency.

In order that the discriminator may handle two input frequencies, there are incorporated in each tuned secondary circuit not simply one but two capacitors one of which, in each secondary, may be selectively connected into or disconnected from its respective tuned circuit by manipulations externally of the discriminator case. This operation changes the resonant frequencies of circuits to correspond to one or the other of the two predetermined frequencies at which the discriminator is designed to operate.

To compensate for variations in the magnitude of the discriminator output, normally attendant to a shift in operating frequencies, the present discriminator embodies means for varying the inductance of the primary in a manner to counteract the change in the output and maintain the latter substantially constant for a given amplitude and frequency deviation.

The invention also utilizes an inductor in the secondary circuit for counteracting changes in phase shift occasioned by switching from one frequency to the other. This inductor maintains the phase angle between the discriminator output and input substantially constant for a given amplitude and deviation.

Figure 2:
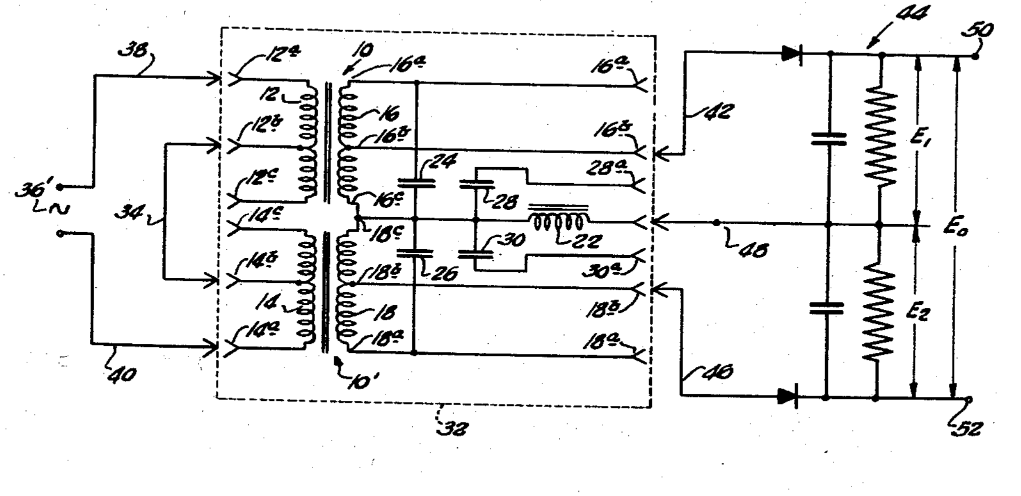

It is believed that the invention may be best understood from the following detailed description of a present preferred embodiment thereof taken in conjunction with the accompanying drawings wherein:

Fig. 1 is a schematic circuit diagram illustrating the present discriminator circuit set for operation at a given frequency; and Fig. 2 is a schematic circuit diagram similar to that of Fig. 1, but illustrating the discriminator circuit set for operation on another frequency.

Referring now to these drawings, the illustrative embodiment of the present discriminator, schematically shown in those figures, comprises a pair of transformers 10 and 10′ including a pair of primary windings 12 and 14 and a pair of secondary windings 16 and 18 each of which windings is tapped at an intermediate turn, for reasons to be presently appreciated. The several terminals of each winding have been designated by the letters *a*, *b*, and *c* so that the three terminals of primary winding 12, for example, are 12*a*, 12*b* and 12*c*. The terminals of the other windings are similarly designated. As will shortly be more fully explained, the terminals 12*a* and 14*a* form input terminals of the discriminator for connection to a source of a frequency modulated signal to be detected by the discriminator.

The secondary terminals 16*c* and 18*c* are tied to a common lead 20 having an inductor 22 series connected therein and terminating in a terminal 20*c*. Shunting the secondary windings 16 and 18 are a first pair of capacitors 24 and 26, and indicated at 28 and 30 are a second pair of capacitors having one lead connected to the common lead 20 and their other leads connected, respectively, to terminals 28*a* and 30*a*.

As preliminarily discussed, in many installations, the present discriminator will be contained in a hermetically sealed case. Such a case for the discriminator is illustrated in phantom lines at 32 in Figs. 1 and 2. To permit frequency changeover, that is, conditioning of the discriminator for operation on a selected frequency, the above mentioned terminals may comprise, for example, female connectors, as indicated, mounted in panels of case 32 and accessible exteriorly of the latter for reception therein of male connectors on leads, as described below.

To accomplish operation of the discrimniator at one of its frequencies, leads 12*c* and 14*c* are joined, as by an external electrical lead 34 carrying terminal male connectors, shown, removably received in the female connectors comprising said terminals 12*c* and 14*c*. Also input terminals 12*a* and 14*a* are connected to a source 36 of the frequency modulated signal by leads 38 and 40.

Secondary terminals 16*a* and 28*a* are connected through a common lead 42 to one input terminal of conventional electrical difference circuitry, generally indicated at 44 while secondary terminals 18*a*, 30*a* are connected through a common lead 46 to another input terminal of the difference circuitry 44. Finally, secondary terminal 20*c* is connected to the third input terminal of circuitry 44 by a lead 48. The output E*o* of the difference circuitry 44 is taken across its output terminals 50 and 52.

In this condition of the discriminator, the secondary windings 16 and 18 and capacitors 24, 28 and 26, 30 form a pair of resonant circuits which will be tuned, by initial selection of capacitors having suitable values to resonate, respectively, at frequencies slightly above and below one of the frequencies at which the discriminator is designed to operate. By way of illustration, exemplary values of the various circuit elements for operation of the discriminator on a frequency of 450, c.p.s. are as follows:

| | |
|---|---|
| $L_{12}$—3.590H | $C_{24}$—0.0058 mfd. |
| $L_{14}$—2.337H | $C_{26}$—0.0044 mfd. |
| $L_{16}$—12.64H | $C_{28}$—0.0098 mfd. |
| $L_{18}$—8.255H | $C_{30}$—0.0038 mfd. |

When operation of the discriminator on another higher frequency for which it is designed, corresponding to the average frequency of a frequency modulated signal from a source 36′, is desired lead 34 is shifted to open primary terminals 12*c*, 14*c* and join primary terminals 12*b*, 14*b* so that the turns of the primary windings between the intermediate terminals 12*b*, 14*b* are removed from the primary circuit between the input terminals 12*a*, 14*a*. In the secondary circuit of the discriminator, terminals 28*a*, 30*a* are opened to disconnect the capacitors 28 and 30 from the tuned circuits of the secondary, secondary terminals 16*a*, 18*a* are opened, and terminals 16*b*, 18*b*, of the intermediate taps on the secondary windings, are connected to the differential circuitry input leads 42 and 46, as shown in Fig. 2. Removal of the secondary capacitors 28 and 30 has the effect of raising the resonant frequencies of the turned circuits in the secondary, the relative values of the capacitors 24, 28 and 26, 30 being so chosen that upon removal of the capacitors 28 and 30 from the circuit, the tuned circuits including the remaining capacitors 24 and 26 will resonate, respectively, at frequencies slightly above and below said other frequency at which the discriminator is designed to operate. For the values of the capacitors heretofore listed the last mentioned frequency will be 675 c.p.s.

It will be apparent that the inductive reactances of the primary coils and Q of the secondary coils, and, therefore, the sharpness of response of the tuned secondary circuits are increased and decreased as the operating frequency is raised and lowered. The discriminator output, for a given amplitude and frequency deviation of the input, is in turn dependent upon the response of the tuned circuits, the output increasing with increased sharpness of response of the tuned circuits.

Accordingly to maintain the same output, for a given amplitude and frequency deviation of the input, at the different operating frequencies for which the discriminator is designed, compensation must be made for the changes in primary inductance and secondary Q. In accordance with the invention, such compensation is performed by the above described connection of the primary intermediate terminals 12*b*, 14*b* to remove a number of the primary turns when operating on the higher frequency, and the connection of the primary end terminals 12*c*, 14*c* to accomplish reinsertion of those turns when operating on the lower frequency so as to vary the turns ratio between each primary and secondary and to decrease and increase, respectively, the inductive reactance of the primary. It will be noted that this switching occurs in conjunction with the connection of the discriminator output terminals to the secondary winding intermediate terminals 16*b*, 18*b* at the higher frequency and to the secondary winding end terminals 16*a*, 18*a* at the lower frequency, thus functioning to counteract the changes in discriminator output with changes in operating frequency. The positions of the intermediate terminals of the primary and secondary coils are made such that the discriminator output voltages will be substantially the same at each frequency for a given amplitude and frequency deviation of the input.

Operation on different frequencies also tends to produce different phase shifts between the discriminator input and output which is undesirable in certain applications. Inductor 22 is provided to compensate for such different phase shifts. It has been found that by trial and error, a value of the inductor 22 may be determined which will yield substantially the same phase angle between the discriminator input and output at both of the operating frequencies for which the discriminator is designed. For the values of the circuit elements previously given, an inductor having a value of 1.600H was found to yield such a substantially constant phase angle.

Circuitry 44 may comprise in the well known manner, a pair of diode detectors of the envelope or peak detection type. The output E*o* of the circuit 44, across terminals 50, 52, will be the difference between the outputs $E_1$, $E_2$ of the individual detectors.

Operation of the present discriminator at each of its frequencies, as well as operation of the difference circuitry 44, are conventional and will be well understood. Thus, with the discriminator connected as shown in Fig. 1, the outputs of the discriminator secondary circuits, across terminals 16*a*, 20*c* and 18*a*, 20*c*, are impressed on the respective peak detectors of the difference circuitry 44, the D.C. potentials $E_1$, $E_2$ across the detectors varying in accordance with the envelopes of the discriminator outputs impressed thereon. The D.C. potential $E_o$ will vary in accordance with the instantaneous electrical difference between the potentials $E_1$ and $E_2$.

When the instantaneous frequency of source 36 has a value equal to said operating frequency corresponding to the discriminator connection of Fig. 1, the secondary outputs and, therefore, the potentials $E_1$, $E_2$ will be equal and accordingly $E_o$ will be zero. As the instantaneous frequency of source 36 deviates from said value the outputs of said secondary circuits will change accordingly, one increasing and the other decreasing in the well known manner. These changes in the outputs of the secondary are reflected in corresponding changes in the potentials $E_1$, $E_2$ and hence in the potentials $E_o$, also in the well known manner. In consequence the output potential $E_o$ will be an approximately linear function of the input frequency if the frequency deviation is limited to the range between the resonant frequencies of the tuned secondaries.

Upon changing the discriminator connections to those shown in Fig. 2, the operating frequency of the discriminator will be raised, the operation of the discriminator being the same as just described except that the secondary outputs will vary in accordance with the deviation of the frequency of source 36' from the new, higher operating frequency.

As previously explained, the outputs of the discriminator, for a given amplitude and frequency deviation, and the phase angle between the input and output, will be maintained substantially constant at the two operating frequencies.

It will be apparent, therefore, that there has been described and illustrated a dual frequency discriminator which is fully capable of attaining the objects and advantages preliminarily set forth and that numerous modifications in design and arrangement of parts of the invention are possible within the scope of the following claims.

I claim:

1. In an electrical frequency discriminator selectively operable at first and second different average frequencies, the combination comprising: primary circuit means including an inductor normally having a predetermined value of inductance and being discretely variable to a different value of inductance; means for selectively applying to said primary circuit means frequency modulated input signals at either the first average frequency or the second average frequency; secondary circuit means inductively coupled to said primary circuit means, said secondary circuit means comprising first and second tuned circuits having substantially equal coupling with the primary circuit means, said tuned circuits being normally tuned to first and second resonant frequencies equally spaced from and on opposite sides of the first average frequency, said secondary circuit being discretely tunable to third and fourth resonant frequencies equally spaced from and on opposite sides of the second average frequency; means for discretely tuning said tuned circuits to resonate at said third and fourth resonant frequencies when the input signal applied to said primary circuit means is at the second average frequency; means for discretely varying the inductance of said primary circuit means to said different value of inductance when the input signal is at the second average frequency thereby to vary the coupling between the primary and secondary circuit means to compensate for changes in the output voltages of the tuned circuits resulting from changes in the operating frequency of the discriminator whereby the same instantaneous output voltages are obtained across said output terminals for a given instantaneous frequency deviation in the signal applied to said input terminals at the different operating frequencies of the discriminator; and inductor means connected to said tuned circuits and forming part of said secondary circuit means, said inductor means having a value of inductance preselected to maintain substantially the same phase angle between the discriminator input signal and output signal at the different operating frequencies.

2. In an electrical frequency discriminator, a primary circuit comprising a pair of primary windings having end terminals and intermediate terminals, one end terminal of each winding forming an input terminal, the input terminals being adapted for connection to sources of frequency modulated signals of different average values, means for selectively electrically connecting said intermediate terminals or other end terminals to vary the turns of the primary windings between said input terminals, a pair of parallel tuned secondary circuits equally inductively coupled with said primary windings respectively and tuned to different resonant frequencies, said tuned circuits having output terminals across which the voltages vary in accordance with the frequency deviation between the instantaneous frequency of the signal impressed on said input terminals and the resonant frequencies of the respective tuned circuits, the discriminator having an operating frequency substantially equal to the mean of the resonant frequencies of the tuned circuits, said tuned circuits each including at least a pair of capacitors, means for selectively connecting and disconnecting one of said capacitors into and from its respective tuned circuit, the values of said capacitors being such that with said one capacitor of both tuned circuits disconnected from the latter the operating frequency of the discriminator is substantially equal to one of said average frequencies and with said one capacitor of both tuned circuits connected in the latter the operating frequency of the discriminator is substantially equal to the other of said average frequencies, the positions of the primary intermediate terminals being such that compensation for the changes in discriminator output voltages with changes in operating frequency is effected by selective connection of the intermediate or other end terminals of the primary windings, a common output terminal, and a common output lead including a toroidal inductor intercoupling said tuned circuits and said output terminal, said inductor having a value such that the phase shift between the discriminator input signal and discriminator output voltage is substantially the same at the different operating frequencies.

3. The combination defined in claim 2 wherein said tuned circuits further comprise a pair of secondary windings equally inductively coupled with the primary windings respectively, said secondary windings being connected in series, said common output lead being connected to the inner ends of said secondary windings, said secondary windings having outer end terminals and intermediate terminals, output terminals connected to each of said outer end and intermediate terminals, the other capacitors of the tuned circuits being permanently connected across their respective secondary windings, said one capacitor of each tuned circuit having one terminal permanently connected to said common output lead, said means for selectively connecting and disconnecting said one capacitor of both tuned circuits into and from their respective tuned circuits comprising removable electrical connectors adapted to releasably connect the other terminals of the latter capacitors and the output terminals connected to the outer end terminals of the secondary windings to establish one operating frequency of the discriminator, another operating frequency of the discriminator being established when the discriminator output is taken across said common output terminal and the output terminals connected to the intermediate terminals of the secondary windings.

References Cited in the file of this patent

UNITED STATES PATENTS

| | | |
|---|---|---|
| 2,299,581 | Korman | Oct. 20, 1942 |
| 2,416,911 | Crosby | Mar. 4, 1947 |
| 2,528,182 | Sands et al. | Oct. 31, 1950 |
| 2,540,813 | Dome | Feb. 6, 1951 |
| 2,581,159 | Achenbach | Jan. 1, 1952 |
| 2,607,890 | Petroff | Aug. 19, 1952 |